May 21, 1968

L. SPENCER 3,384,121

MIXING VALVE

Original Filed April 13, 1964

INVENTOR.

Lloyd Spencer

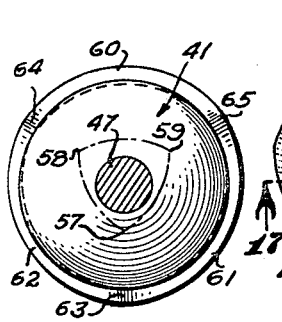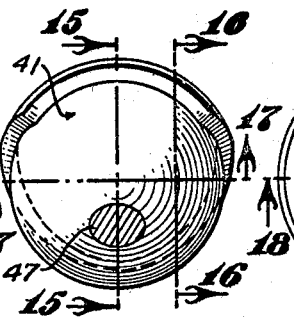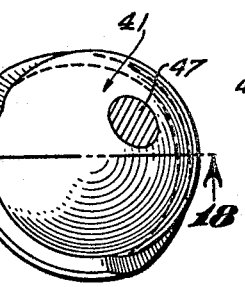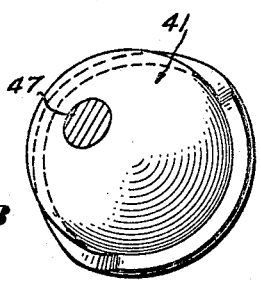
FIG.7  FIG.9  FIG.11  FIG.13
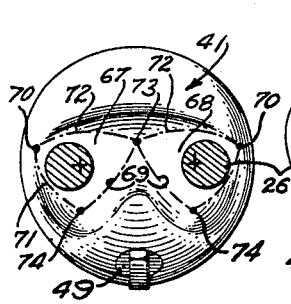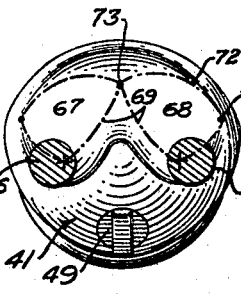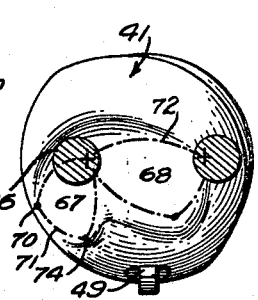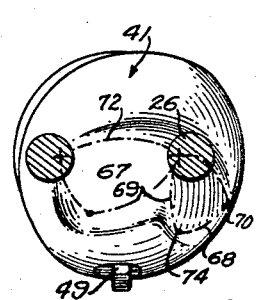
FIG.8  FIG.10  FIG.12  FIG.14
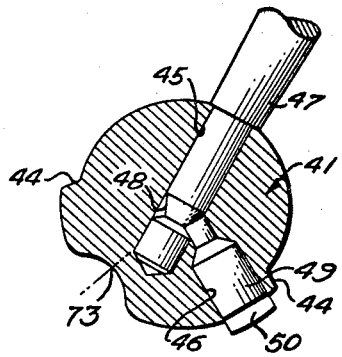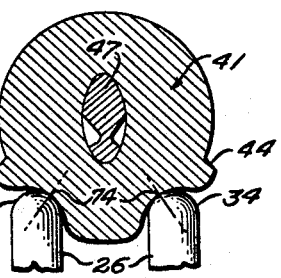
FIG.15  FIG.17
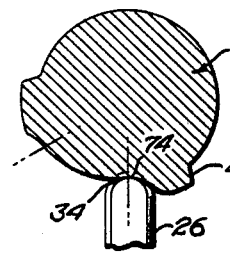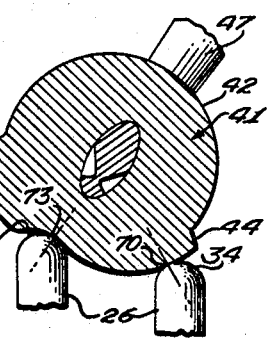
FIG.16  FIG.18
INVENTOR.
Lloyd Spencer INVENTOR.
Lloyd Spencer May 21, 1968 L. SPENCER 3,384,121
MIXING VALVE
Original Filed April 13, 1964 4 Sheets-Sheet 4
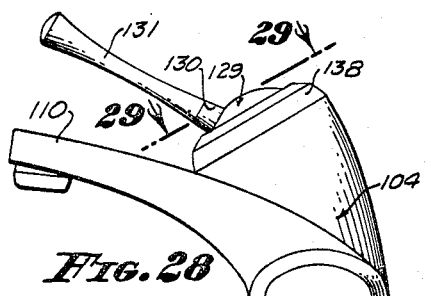
FIG. 28
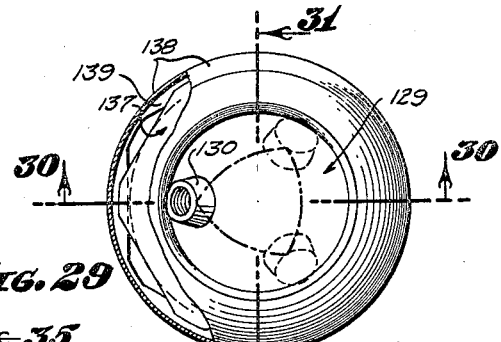
FIG. 29
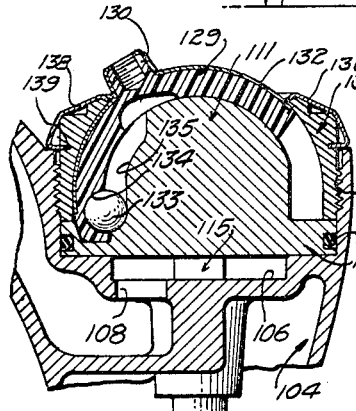
FIG. 30
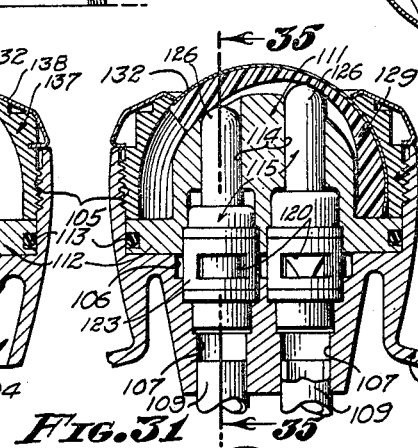
FIG. 31
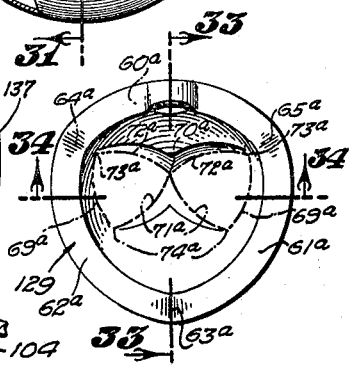
FIG. 32
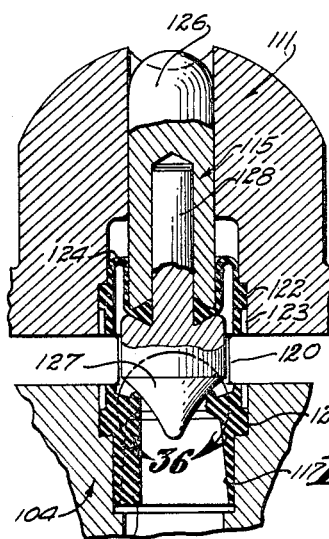
FIG. 35
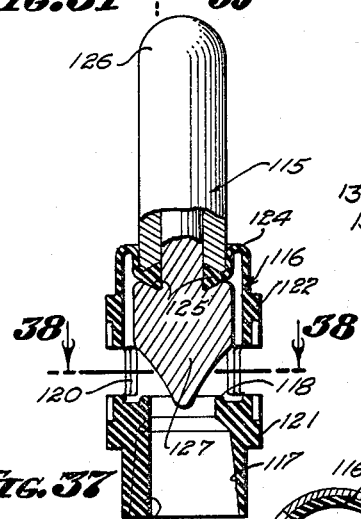
FIG. 37
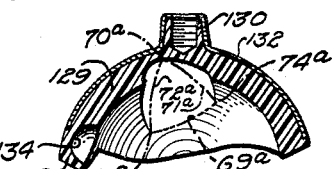
FIG. 33
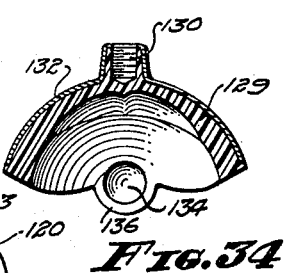
FIG. 34
FIG. 38
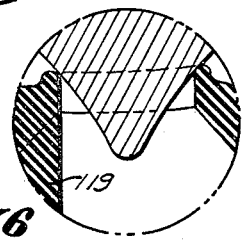
FIG. 36
INVENTOR.
Lloyd Spencer United States Patent Office 3,384,121
Patented May 21, 1968

3,384,121
MIXING VALVE
Lloyd Spencer, 1842 W. 43rd St.,
Los Angeles, Calif. 90062
Continuation of application Ser. No. 359,392, Apr. 13, 1964, which is a continuation-in-part of applications Ser. No. 2,523, Jan. 14, 1960, and Ser. No. 289,806, June 24, 1963. This application Mar. 9, 1967, Ser. No. 622,002
11 Claims. (Cl. 137—625.41)

My invention relates to mixing valves and is a continuation of Ser. No. 359,392, filed Apr. 13, 1964, which is a continuation-in-part of my copending applications for Mixing Valve, Ser. No. 2,523, filed Jan. 14, 1960, and Ser. No. 289,806, filed June 24, 1963, now abandoned.

Included in the objects of my invention are:

First, to provide a hot and cold water mixing valve which utilizes a control ball, which may be globular or in the form of a hollow hemisphere, and external or internal journal element, the ball and journal element having confronting annular stop shoulders one of which is shaped to form an undulating cam having three facets and three peaks so arranged that as the control ball is moved by a handle to effect rolling contact between the stop shoulders, the handle describes a triangular area, and other portions of the control ball move to effect flow of hot and cold water, in unison, in opposition or individually so as to regulate both the temperature and volume of the discharged water.

Second, to provide a hot and cold water mixing valve which, in one embodiment, the control ball is provided with cam surfaces movable about two axes, within the limits determined by the stop shoulders, across the ends of hot and cold water valve units to effect reciprocation thereof.

Third, to provide a hot and cold water mixing valve which is another embodiment, the control ball is provided with flow passages having inlet ends which are movable in about two axes, within the limits determined by the stop shoulders, across hot and cold water inlet ports.

Fourth, to provide a hot and cold water mixing valve wherein an arcuately movable key means limits the control ball to two degrees of movement and wherein a time delay control means is so connected to the key means that, on initial opening movement of the control ball, the time delay period is initiated, and irrespective of the selected setting of the mixing valve, the control ball is automatically moved to close both the hot and cold water supply on operation of the time delay control means.

Fifth, to provide a hot and cold water mixing valve in which the hot and cold water lines are isolated from each other when the valve is in its closed position to prevent cross flow should the pressure in the hot and cold water supply systems differ.

Sixth, to provide a hot and cold water mixing valve which may utilize valve units closed by water pressure or valve units which are closed against water pressure.

With the above and other objects in view as may appear hereinafter, reference is directed to the accompanying drawings, in which.

FIGURES 7 to 18 inclusive are various views of the control ball, in which:

FIGURE 7 is a top view of the control ball with the handle in a vertical position, the handle being sectioned in a plane contiguous to the surface of the control ball and indicating by broken lines the boundaries of movement of the axis of the handle.

FIGURE 8 is a bottom view of the control ball in a position corresponding to FIGURE 12 with the cam followers shown in section and indicating by broken lines the boundaries of the cam areas traced by the points of contacts of the cam followers with the control ball.

FIGURE 9 is a top view similar to FIGURE 12 but showing the control ball in its "off" position.

FIGURE 10 is a corresponding bottom view showing the control ball in its "off" position.

FIGURE 11 is a top view of the control ball in the position assumed when the "cold" water valve is full "on" and the "hot" water valve is "off."

FIGURE 12 is a corresponding bottom view of the control ball.

FIGURE 13 is a top view of the control ball shown in its position wherein the "hot" valve is in its full "on" position and the "cold" valve is in its "off" position.

FIGURE 14 is a corresponding bottom view thereof.

FIGURE 15 is a sectional view of the control ball taken through 15—15 of FIGURE 9, the control ball being shown in its "off" position.

FIGURE 16 is a parallel sectional view of the control ball taken through 16—16 of FIGURE 9.

FIGURE 17 is a sectional view of the control ball taken through 17—17 of FIGURE 9 also with the control ball shown in its "off" position.

FIGURE 18 is a sectional view similar to FIGURE 17, but taken through 18—18 of FIGURE 12 and showing the control ball in the position corresponding to the position shown in FIGURES 11 and 12; that is, with the "hot" valve in its "off" position and the "cold" valve in its full "on" position.

Figure 1:
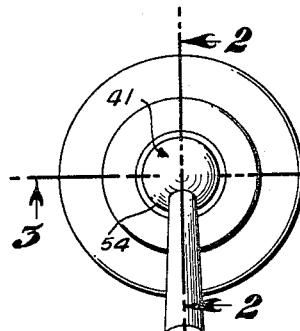
FIGURE 1 is a front view showing one embodiment of the mixing valve.
Figure 4:
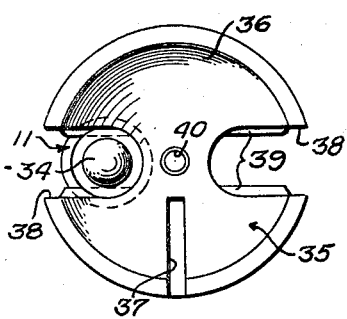
FIGURE 4 is an end view of the control ball journal cup showing one of the valve assemblies retained therein.
Figure 5:
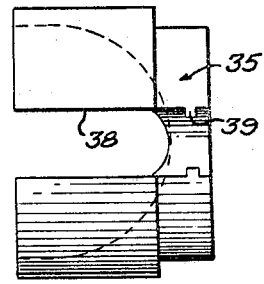
FIGURE 5 is a side view thereof.
Figure 2:
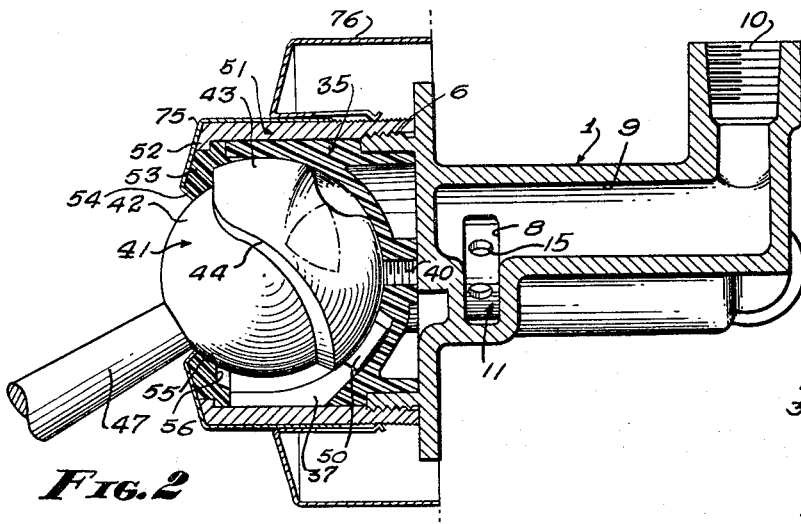
FIGURE 2 is a sectional view thereof taken through 2—2 of FIGURE 1.
Figure 19:
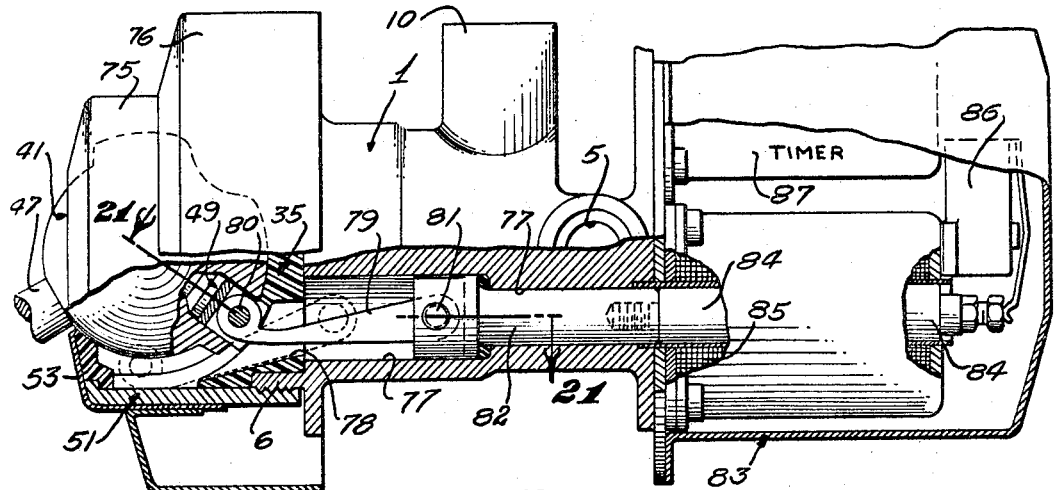

FIGURE 19 is a partial side view partial sectional view of the mixing valve similar to FIGURE 2 showing means for connection to a time delay in order that the mixing valve may be shut off after a predetermined interval.

Figures 20, 21:
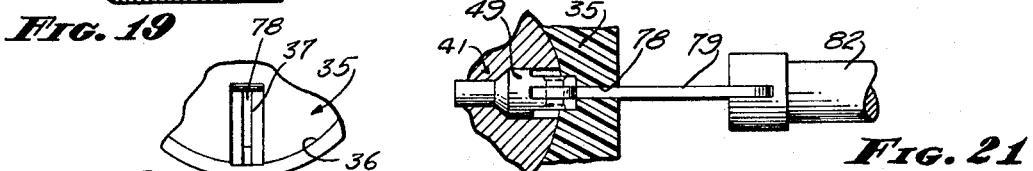

FIGURE 20 is a fragmentary front view of the control ball journal socket modified for accommodation of a time delay means.

FIGURE 21 is a fragmentary sectional view taken through 21—21 of FIGURE 19 showing the control ball and means for attachment to the time delay means.

Figure 22:
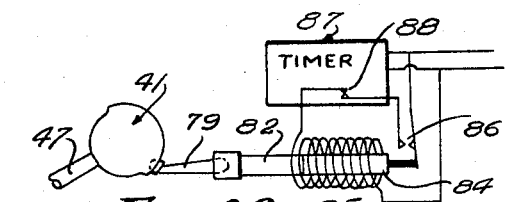

FIGURE 22 is an electrical diagram of the time delay means.

Figure 3:
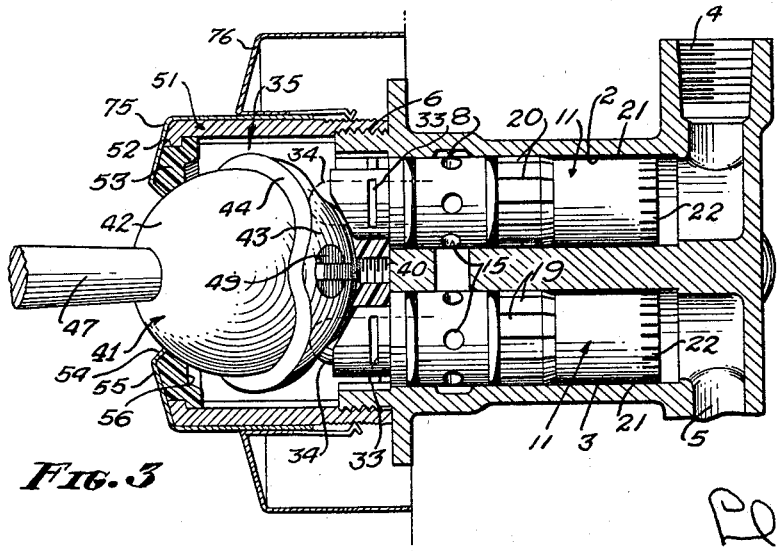
FIGURE 3 is a sectional view thereof taken through 3—3 of FIGURE 1.
Figure 23:
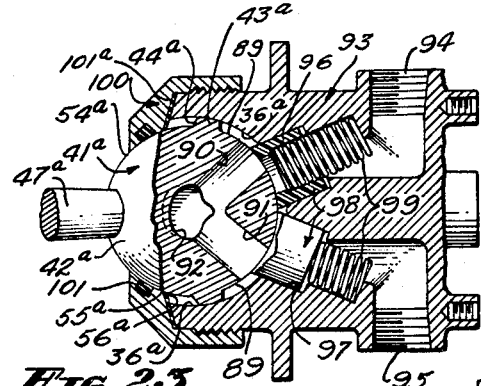

FIGURE 23 is a sectional view similar to FIGURE 3 showing a modified mixing valve wherein the control ball is provided with passages which communicate with inlet ports, but which incorporates a cam shoulder for limiting movement essentially as shown in connection with the mixing valve shown in FIGURES 1 through 22.

Figure 24:
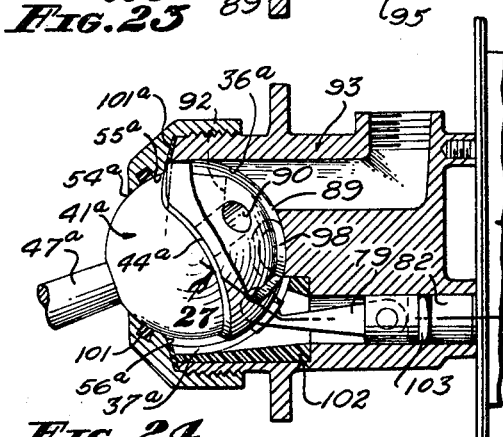

FIGURE 24 is a sectional view at right angles to FIGURE 23 and corresponding to FIGURES 2 and 19, with the time delay means indicated fragmentarily.

Figures 25, 26:
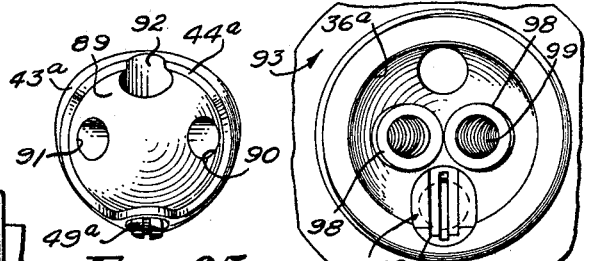

FIGURE 25 is a back view of the modified control valve.

FIGURE 26 is a front view of the modified mixing valve with the control ball and retainer cap removed.

Figure 27:

FIGURE 27 is a fragmentary sectional view taken through 27—27 of FIGURE 24 showing the control ball and means for connection to the time delay means.

FIGURE 28 is a reduced side view of a modified form of mixing valve in which the control ball is in the form of a hollow hemisphere.

FIGURE 29 is an enlarged end view thereof taken from 29—29 of FIGURE 28 with the handle and valve body omitted and portions shown in section.

FIGURE 30 is a fragmentary sectional view thereof taken through 30—30 of FIGURE 29 showing the hollow hemispherical cam in its position wherein both valve units are closed.

FIGURE 31 is a similar fragmentary sectional view taken through 31—31 of FIGURE 29 showing the control ball in its position wherein one valve unit is closed and the other is open.

FIGURE 32 is a bottom view of the hollow hemispherical control ball showing the cam surfaces thereof.

FIGURE 33 is a sectional view thereof taken through 33—33 of FIGURE 32.

FIGURE 34 is a sectional view taken through 34—34 of FIGURE 32.

FIGURE 35 is an enlarged fragmentary sectional view taken through 35—35 of FIGURE 31 showing one of the valve units in its closed position.

FIGURE 36 is a further enlarged sectional view taken within circle 36 showing the initial open condition of a valve unit.

FIGURE 37 is a sectional view similar to FIGURE 35 showing a valve unit in its fully open position.

FIGURE 38 is a transverse sectional view thereof taken through 38—38 of FIGURE 37.

Reference is first directed to FIGURES 1 through 6. The mixing valve here illustrated includes a valve body member 1 having parallel contiguous bores 2 and 3 connected respectively to a cold water inlet 4 and hot water inlet 5. The forward ends of the bores intersect a common outer surface surrounded by an externally screwthreaded rim 6.

Near their forward ends the bores enlarge to form outlet channels 7 which are interconnected by a cross port that is, in turn, connected to an outlet bore 9 parallel to the bores 2 and 3. The bore 9 is connected with a water outlet 10.

Figure 6:
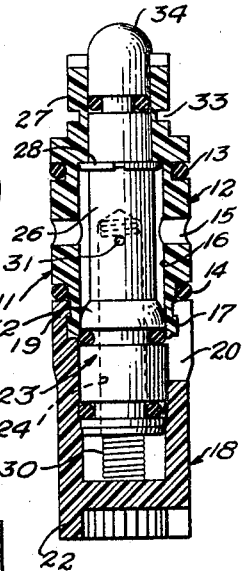
FIGURE 6 is an enlarged longitudinal sectional view of one of the valve assemblies.

Each bore receives a valve assembly 11 shown best in FIGURE 6. Each valve assembly includes a tubular liner 12. Externally, the liner 12 is provided with spaced grooves which receive O-rings 13 and 14 for sealing engagement with bore 2 or 3 on opposite sides of the corresponding outlet channel 7. Between the O-rings, the liner is provided with radial outlet ports 15. Internally, the rear portion of the liner is provided with a counterbore 16 which intercepts the ports 15.

The liner 12 terminates rearwardly from the O-ring 14 and is reduced in outer diameter to form a shallow channel bordered by an annular bead 17 forming the terminal portion of the liner. The inner end of the liner receives a terminal cap member 18 in the form of a cup having an internal diameter equal to the counterbore 16. The forward end of the cap member 18 is provided with a plurality of equally spaced longitudinal slits forming therebetween a plurality of fingers 19 internally grooved near their extremities to snap over the bead 17 for retension on the liner 12. The slits between the fingers beyond the liner 12 form inlet ports 20.

Rearwardly or upstream from the inlet ports 20, the cap member 18 is reduced slightly in diameter to form with the surrounding bore an annular inlet passage 21 having a width approximating the width of the inlet ports. The upstream extremity of the cap member is provided with an annular axially extended rim 22 having a plurality of slits to form, with the passage 21 and inlet slit ports 20, a filter for restraining particles of excess size from entering the liner 12.

Each liner 12 and cap member 18 receives a piston valve 23 having spaced annular channels to receive O-rings 24 and 25. The O-ring 24 is movable from a forward sealing position partially within the rear end of the liner 12 to rearward open positions within the inlet ports 20, internally the fingers 19 may be enlarged slightly to permit free movement of the O-ring 22 when in its open position yet retain the O-ring in its groove. The O-ring 25 sealingly engages the walls of the cap member.

The piston valve 23 includes a stem 26 which protrudes from the forward or outer end of the liner 12. The stem is provided with an O-ring 27 fitting the forward portion of the liner bore beyond the counterbore 16. The stem is also provided with a stop ring 28 to limit forward movement of the piston valve beyond a point at which sealing contact is had by the O-ring 24 with the liner 12.

The piston valve 23 is provided with a socket 29 extending forwardly from its inner end. The socket receives a spring 30 to urge the piston valve forwardly. A small side port 31 is provided in the forward end of the socket to expose the interior of the socket member to pressures downstream of the O-ring 24 so that the armature is balanced. Adjacent the O-ring 24, the stem is enlarged to form a flow restrictor 32.

The forward or outer end of the liner 12 is reduced in outside diameter and provided with retainer slots 33 on opposite sides. The outer extremity of the liner is beveled and the stem 26 protrudes therefrom and is rounded to form a cam follower tip 34.

The outer end of the valve body member 1 is fitted with a retainer cup 35 which, externally, is essentially cylindrical, but which, internally, is shaped to form an outwardly facing hemispherical socket 36. At one side the retainer cup 35 is provided with a key pin slot or track 37. The retainer cup is also intersected by two diametrically disposed recesses 38 at right angles to the key pin slot 37 which receive the reduced outer ends of the pair of liners 12 and are bordered by ribs 39 which fit the slots 33. The beveled outer ends of the liners conform approximately to the contour of the socket 36.

The two valve assemblies 11 are adapted to be slipped sidewise in the recesses 38 before insertion in the bores 2 and 3 so as to be retained by the retainer cup 35. Alternatively, the liners may be integral with the retainer cup, particularly if molded of high strength heat resistant plastic material. The retainer cup is provided with a central screwthreaded hole 40 for reception of a screw, not shown, to facilitate extraction of the valve assemblies from their bores, Journaled within the retainer cup 34 is a control ball or spherical cam structure 41. The control ball includes an outer hemispherical part 42, an inner hemispherical part 43 of larger radius and defines therebetween an undulating cam shoulder 44 having three facets. The outer hemispherical part 42 protrudes through the open end of the retainer cup housing and universally journals within the socket 35.

The control ball is provided with a handle socket 45 extending deeply therein from the central portion of the outer hemispherical part 42. A key pin socket 46 extends radially into the control ball from the inner hemispherical part 43 and intersects the socket 44. Fitted in the handle socket 45 is a handle 47 having an annular groove 48 in the zone of intersection of the socket 46. The key pin socket 46 journals a key pin 49, the inner end of which fits within the groove 48 to lock the handle in the socket 45 but permit its rotation relative to the control ball.

The outer end of the key pin 49 forms a diametrically extending key rib 50 projecting a slight distance from the surface of the control ball which fits the key slot 37 in the retainer cup 34. The key slot 37 and key rib 50 prevent rotation of the control ball 41 about the axis of the handle 47, but permits movement, within limits, of the control ball about its two other axes of rotation.

The retainer cup 35 retains the key pin 49 in place so that it, in turn, holds the handle in its socket but permits its rotation, thus providing a construction which is substantially tamper proof. That is, without removal of the cam housing, the handle cannot be removed. Ideally, the key pin 49 should be disposed at right angles to the axis of the handle 47, but in order to provide for maximum range of movement of the cam ball and permit the use of a cam housing having a centered opening, the axis of the key pin may form an angle of 110° to 120° with the handle without adversely affecting the desired movement of the cam ball.

A cylindrical retainer sleeve 51 is screwthreaded to the rim 6 of the valve body 1 and receives the retainer cup 35 and is provided with an internal flange 52 within which is a stop ring 53 formed of plastic material. The stop ring forms an opening 54 through which extends the outer hemispherical part 42 of the control ball. Bordering the opening is a spherical portion 55 having a center coinciding with the center of the control ball 41 and retainer cup 35 so as to journal the control ball about a point.

Radially outwardly of the spherical portion 55 is a stop shoulder 56 which engages the outer end of the retainer cup 35 and within the cup is engaged by the cam shoulder 44 to limit movement of the control ball 41.

The cam shoulder 44 is so shaped as to limit movement of the handle 47 to essentially a triangular area which is preferably centered with respect to the circular opening 54 within the stop ring 53. This area is defined as shown in FIGURE 7 by three apices, 57, 58 and 59; the lower or front apex 57 corresponding to the "off" position of both valve assemblies, the apex 58 to the left representing the position of the handle when the "hot" valve assembly is full on, and the apex 59 representing the handle position when the "cold" valve assembly is full "on."

In order to confine the handle to this area, the cam shoulder 43 has three sides or facets 60, 61 and 62 which approximate planes through the cam ball each inclined with respect to the others. Between these sides are rounded apices or peaks 63, 64 and 65. When the side 60 engages the stop shoulder 56, the handle 47 is in its "off" position corresponding to apex 57 of the triangle shown in FIGURE 7. Similarly, the sides 61 and 62 correspond to the apices 58 and 59. As the handle moves from one apex to another, the control ball rocks from one side to another. The stop shoulder 56 and cam shoulder 44 engage with an essentially rolling nonsliding contact so as to minimize wear and insure a free movement easily controlled by manipulation of the handle 47.

This movement of the handle causes portions of the surface of the inner hemispherical part 43 to traverse the cam follower tips 34. The points of contact of the cam follower tips describe essentially triangular cam areas 67 and 68 corresponding to the triangle defined by the apices 57, 58 and 59. The cam areas are contoured to approximate portions of spheres of equal radius but which are tilted or essentric with respect to the center of the inner hemispherical part 43. More particularly, each cam area includes a leg or side 69 which is concentric with the center of the cam ball and below the normal surface of the inner hemispherical part at a depth slightly in excess of the intended range of travel of the moving valve seat of the corresponding valve assembly. The opposite apex 70 of each cam area may coincide with the normal surface of the inner hemispherical part 43. From each apex 70 the adjacent sides 71 and 72 curve eccentrically to the normal surface of the inner hemispherical part until they terminate in apices 73 and 74 respectively at the extremities of the side 69 of the corresponding cam area.

The cam areas 67 and 68 are so related that their apices 73 may coincide and the sides 69 diverge therefrom, with the apices 70 distally related. When the two apices 74 register with the two cam follower tips 34 of the valve assemblies, both valve assemblies are in their "off" position, thus these apices correspond to the apex 57 shown in FIGURE 7. This position of the control ball is shown particularly in FIGURES 9, 10, 15, 16 and 17.

When the handle 47 is moved from apex 57 to apex 58; that is, upwardly and to the right as in FIGURE 7, the side 69 of the cam area 68 which controls the "hot" valve assembly moves across the corresponding cam follower and this side, being concentric with the control ball, the hot valve assembly is unaffected. However, the side 72 of the other cam area 67 traverses the cam follower of the "cold" valve assembly moving that valve assembly to its full "on" position. This is the position of the control ball shown in FIGURES 11 and 12.

Similarly, movement of the handle from the apex 57 to the apex 59, that is, upwardly and to the left as shown in FIGURE 7, the "cold" valve assembly remains "off" and the "hot" valve assembly is moved to full "on." This is the position shown in FIGURES 13 and 14. When the handle is moved between apices 58 and 59, one valve assembly moves toward its "on" position and the other toward its "off" position.

Movement of the handle inwardly of the boundaries defined by the apices 57, 58 and 59, produces partial movements of the valve assemblies; for example, the handle when positioned as shown in FIGURE 7, opens each valve approximately halfway. This forward and backward movement of the handle regulates volume; whereas, lateral movement regulates temperature. By selection of the contour of the cam areas 67 and 68, and by selection of the contour of the flow restrictors 32, an accurately predictable volume of flow from each valve assembly for any position of the valve handle may be attained.

The retainer sleeve 51 may be covered by a thin shell 75 for ornamental purposes and a suitable escutcheon ring 76 may be provided to compensate for location of the valve body 1 when wall mounted. While the valve is illustrated as wall mounted and suitable for a shower value, it should be understood that the mixing valve may be arranged for other uses such as a kitchen or lavatory sink valve.

Reference is now directed to FIGURES 19 to 22 inclusive. The mixing valve here illustrated embodies all of the features of the previously described valve with the addition of means for effecting automatic shut off. For this purpose an additional bore 77 is provided in the valve body member 1. This bore is isolated from the water passage therein. The front end of the bore confronts the retainer cup 35 and a slit 78 communicates between the key pin slot or groove 37.

The key pin 49 is modified by the addition of a slot which journals one end of a link 79 by means of a journal rivet 80. The link 79 extends into the bore 77 and is pivotally connected by a journal rivet 81 to a plunger 82.

Suitably mounted at the rear end of the valve body member 1, is a housing 83 which contains a solenoid armature 84 connected to the plunger 82. The armature is reciprocable within solenoid 85.

Also within the housing 83 is a switch 86 which is held open when the mixing valve is in its closed position and the armature is in its extreme rearward position. Upon opening of the mixing valve, the switch initiates operation of an electrical time delay unit 87 having an initially open switch 88. That is, when the handle 47 is raised to open the mixing valve, the plunger 32 and armature 84 is moved forwardly to close the switch 87.

The time delay 87, after a predetermined interval, closes the switch 88 to energize the solenoid 86 which returns the armature to its initial position and, in doing so, pulls on the plunger 82, line 79 and key pin 49 to draw the cam ball 41 to its off position shown in FIGURES 20 and 19. During the period predetermined by the time delay, the mixing valve may be manually adjusted to any position to provide any desired volume or temperature of water. Should it be desirable to shut off the mixing valve before operation of the time delay, this may be done without interference by the time delay means.

Reference is now directed to FIGURES 23 through 27. The mixing valve here illustrated differs from the first described mixing valve in that the modified mixing valve includes a control ball 41a which serves both as a cam ball and as a valve ball. The control ball 41a is provided with a hemispherical outer part 42a, an inner hemispherical part 42a and a cam shoulder 44a, but in place of the cam areas 67 and 68, the hemispherical part 42a is provided with a valve area 89 which spherically contoured and may have the same radius as the outer hemispherical part 42a.

Intersecting the valve area 89 is a hot water port 90 and a cold water port 91 forming radially inwardly converging passages which intersect each other and also intersect a water outlet port 92. The outlet port also intersects the surface of the valve area 89.

A valve body 93 is provided which includes a hot water inlet passage 94 and cold water inlet passage 95. These intersect converging recesses 96 and 97, which in turn intersect a common hemispherical retainer socket 36a. The retainer socket corresponds to the socket 36 provided in the retainer cup 35, and journals the cam and valve ball 41a.

The recesses 96 and 97 receive valve seat members 98 formed of a suitable elastomer and having forward faces which are spherically contoured for sealing engagement with the control ball 41a. Springs 99 urge the seats into sealing contact.

A retainer ring 100 is adapted for screwthread engagement with the forward end of the valve body 93 and is provided with an internal flange forming an opening 54a, spherical portion 55a and stop shoulder 56a, corresponding to the opening 54, spherical portion 55, and stop shoulder 56 of the first described structure. In addition the spherical portion 55a is provided with a groove which receives an O-ring 101 for sealing engagement with the outer part 42a of the control ball and a gasket 101a is interposed between the retainer ring and valve body. This outer part is provided with a handle 47a, which is screwthreaded or otherwise secured directly to the control ball.

As in the first structure, the control ball 41a is provided with a key pin 49a which rides in a key pin slot or groove 37a formed in the socket 36a disposed in a plane at right angles to a plane common to the recesses 96 and 97. In this case, the key pin slot is formed in a plug 102 set in a recess formed at one side of the recesses 96 and 97.

The control ball 41a moves within the boundaries determined by the cam shoulder 44a in the manner of the control ball 41. Such movement causes the hot and cold water ports to move to and from coincidence with the valve seats 98 for volume selection or for individual selection of hot or cold water.

As in regard to the first described mixing valve, the modified mixing valve may be provided with a time delay means which may be essentially identical, except that the plunger 82 is provided with a sealing O-ring 103.

While the stop shoulder is shown as formed within the journal means for the control ball, and the cam shoulder is shown on the control ball, it should be noted that the stop shoulder may be provided on the control ball and the cam shoulder within the journal means.

It should be noted, in regard to the valve assembly shown in FIGURE 6 that the cap member 18 is capable of limited lateral displacement so that the piston valve 23 readily alines the bore of the cap member with the counterbore 16.

Reference is now directed to FIGURES 28 through 38. In the construction here illustrated, the control ball is in the form of a hollow hemisphere, and is illustrated as incorporated in a lavatory type valve body 104. The valve body is provided with an internally screwthreaded recess 105 having a depression at the bottom thereof forming a mixing chamber 106. The mixing chamber is intersected by a pair of inlet openings 107 and by an outlet opening 108. The inlet openings are connected by tubes 109 to inlet fittings, not shown, and the outlet opening is connected to a discharge spout 110.

Fitted within the recess 105 is a hemispherical journal member 111 having a flange 112 at its bottom end covering and closing the mixing chamber 106. A seal ring 113 carried by the flange 112 forms a sealing connection with the walls of the recess 105. The journal member 111 is provided with parallel bores 114 which are coaxial with the inlet openings 107.

The inlet openings 107 and their aligned bores 114 receive valve units 115. Each valve unit includes a sleeve 116 formed of rubber or other elastomer. The lower end of the sleeve forms an annular lip 117 sealingly engaging the walls of the corresponding opening 107. Above the sealing lip 117 the sleeve is internally constricted to form an upwardly directed annular valve seat 118 which is capable of limited axial displacement. At one side the sealing lip and valve seat 118 is provided with an internal axially extending rib 119 the function of which will be brought out hereinafter.

Above the valve seat 118, the sleeve 116 is provided with lateral ports 120 communicating with the valve chamber 106. Externally below and above the ports are external flanges 121 and 122 which fit within counterbores formed in the walls of the openings 107 and bores 114 respectively. Between the flanges, the sleeve is constrained by a rigid collar 123 with ports coinciding with the ports 120.

Above the flange 122, the sleeve 116 is provided with a flexible re-entrant portion 124 terminating in an internal flange 125. Slidable within each valve bore 114 is a valve stem 126 having a hemispherical cam follower end 127. Reciprocally mounted within the sleeve 116 is a valve armature 128 having a pointed end adapted to enter and sealingly engage the valve seat 118. A pin 128 extends from the valve armature and is adapted to be press fitted in the valve stem 126. The confronting ends of the valve stem and valve armature clamp the internal flange 125 of the sleeve 116 therebetween.

The journal member 111 receives a hollow hemispherical control ball 129 which is preferably molded of high strength plastic material and having an approximately centered handle boss 130 to which is attached a handle 131. The external surface of the control ball may be covered with a thin metal shell 132. The annular surface forming the bottom extremity of the control ball 129 forms three essentially flat faces 60a, 61a, and 62a, corresponding respectively with the three facets 60, 61, and 62 of the control ball 41 shown best in FIGURES 7 through 18. The three faces are separated by apices or peaks 63a, 64a and 65a corresponding to the peaks 63, 64 and 65 of the control ball 41.

The hemispherical internal surface of the hemispherical control ball 129 is provided with two essentially triangular cam areas defined by sides 69a, 71a, and 72a corresponding to sides 69, 71, and 72 of the control ball 41; and apices 70a, 73a, and 74a, corresponding to apices 70, 73, and 74 of the control ball 41.

It should be noted however, that the valve units 115 of the modified valve shown in FIGURES 28 through 38 are arranged to close against water pressure; thus, the concentric sides 69a coincide with the normal surface of the control ball 129 and form the relatively remote sides of the triangular cam areas. Stated otherwise, location of sides 69a and 71a and apices 70a and 73a are reversed with respect to the corresponding sides and apices of the control ball 41. In this regard, it should be observed that each of the control balls 41 and 129 may be adapted for valve units which are closed or which are opened by water pressure.

In a manner analogous to the first described structure, means are provided to prevent rotation of the control ball 129 about the axis of its handle 131. This is accomplished by a key ball 133 set in a socket 134 provided in the control ball 129 which rides in an arcuate groove 135 provided in the journal member 111. The groove 135 is located in a plane at right angles to the common plane through the axes of the bores 114.

The key ball socket 134 may be located in a plane passing through the peak 63a, handle axis and center of the facet 60a, and circumferentially displaced from the handle axis as far as possible. The key ball socket is illustrated as set in a boss 136 extending from the center of the facet 60a. The boss 136 moves into a clearance recess in the flange 112 as shown in FIGURE 30. The key ball could as well be located adjacent the peak 63a or in a boss forming an extension thereof, without significant change in the location or shape of the cam areas.

The control ball 129 is held in place by a retainer ring 136 the internal surface of which is spherical. The retainer ring is externally screwthreaded for reception in the recess 105 and its axially inner end engages the margin of the flange 112 to seat the flange at the bottom of the recess. The exposed portion of the retainer ring terminates in a circular opening which exposes the control ball 129 and is dimensioned to permit maximum excursion of the handle boss 130. Externally of its opening the retainer ring is provided with a hexagonal portion to receive a wrench.

The hexagonal portion is covered by an escutcheon ring 138 which is removably attached to the retainer ring 137 by means of an interrupted internal flange 139 fitting a mating groove in the hexagonal portion of the retainer ring.

Operation of the modified mixing valve shown in FIGURES 28 through 38 is as follows:

When the hollow hemispherical control ball 129 is moved to cause progressive contact between the upper face of the flange 112 and the three lobe cam represented by facets 60a, 61a, and 62a and peaks 63a, 64a, and 65a, the handle 131 describes the triangular path indicated by broken lines in FIGURE 29 and the cam follower tips 127 follow the boundaries of the cam areas shown in FIGURE 32. The valve units are caused to move in unison or in opposition between open and closed positions in a manner closely analogous to the operation of the control ball 41.

While the orientation of the cam surfaces of the hollow hemispherical control ball 129 may be such as to operate the valve units 11 of the first described mixing valves, they are shown as arranged to operate the valve units 115 which close, rather than open, against water pressure.

The valve seats 118 of the valve units 115 are axially yieldable a limited distance to insure sealing engagement with the valve armatures 128 and to compensate for wear. Also, as a valve armature 128 approaches seating engagement, the pressure differential across its valve seat 118 urges the valve seat axially toward engagement with the valve armature.

It will be noted that the valve units are free of springs; that is, the only force available to open the valve units is the force of the water upstream of the valve armature against the exposed area thereof. Under conditions of low water pressure and infrequent use of the valve unit, there is a tendency of the valve seat to stick to the valve armature and resist opening. This condition is minimized by the rib 119 which provides, at one portion of the periphery of the valve seat, increased resistance to axial movement. As a consequence, the valve seat strips progressively from the valve armature as suggested in FIGURE 36, materially reducing the force required to effect separation.

It will be observed that the re-entrant portion 124 of the sleeve 116 forms a rolling seal between the valve stem and the surrounding bore and offers a minimum of frictional resistance so as to insure free movement of the valve armature and its stem.

Although particular embodiments of the invention have been shown and described, the invention is not limited thereto, but includes the constructions, combinations and arrangements embraced in the appended claims.

I claim:
1. A mixing valve, comprising:
(a) a control member of spherical contour;
(b) a valve body structure including a journal means for said control member, said journal means and control member cooperating to limit said control member to movement about a point center;
(c) means interconnecting said control member and journal means to limit movement of said control member to two axes of movement about said center;
(d) a handle for moving said control member;
(e) circular confronting stop shoulders formed by said control member and said journal means, one of said stop shoulders being contoured to form a cam having a plurality of facets and peaks therebetween, whereby, on rolling contact with said stop shoulders, said handle and regions at the side of said control member opposite from said handle, describe essentially polygonal figures;
(f) and valve units in said body structure confronting said regions and responsive to movement of said control member for opening and closing flow passages therein.
2. A mixing valve as set forth in claim 1, wherein:
(a) the polygonal figures described by said regions are cam areas;
(b) and said valve units include cam followers engageable with said cam areas to open and close said valve units.
3. A mixing valve as set forth in claim 1, wherein:
(a) said control member is globular in form and its circular stop shoulder and cam areas are on the outer surface thereof and face in opposite directions.
4. A mixing valve as set forth in claim 1, wherein:
(a) said control member is a hollow hemisphere and said cam areas are disposed on the interior surface thereof, and its stop shoulder forms an extremity thereof;
(b) and the stop shoulder and cam areas of said control member face in the same direction.
5. A mixing valve as set forth in claim 1, wherein:
(a) said control member is provided with inlet passages intersecting the surface of said control member at said regions, and also an outlet passage clear of the areas delineated by said polygonal figures;
(b) and said valve units include seat elements sealingly engageable with the surface of said control member.
6. A mixing valve, comprising:
(a) a valve body structure having hot and cold water inlets and an outlet;
(b) an essentially spherical journal means at one end of said valve body structure;
(c) a control member of spherical contour journaled by said means for movement about a point center;
(d) an exposed handle for said control member;
(e) means for limiting said control member to two axes of movement about said center;
(f) circular confronting stop shoulders formed by said journal means and said control member, one of said shoulders being contoured to form a cam having three facets and peaks therebetween whereby, on rolling contact between said stop shoulders, said handle and regions at the side of said control member opposite from said handle describe essentially triangular figures;
(g) and valve units in said hot and cold water inlets and confronting said regions, said valve units being responsive to movement of said control member for opening and closing said inlets.
7. A mixing valve as set forth in claim 6, wherein:
(a) the triangular figures described by said regions are cam areas;
(b) and said valve units include cam followers engageable with said cam areas to open and close said valve units.
8. A mixing valve as set forth in claim 6, wherein:

(a) the stop shoulder of said journal means surrounds an accommodation opening in said journal means;
(b) said control member is globular, and the circular shoulder and cam areas thereof are faced in opposite directions.

9. A mixing valve as set forth in claim 6, wherein:
(a) said control member is in the form of a hollow hemisphere;
(b) said cam areas are disposed on the interior surface of said control member, the circular stop shoulder of said control member forms an extremity thereof, and said cam areas and stop shoulder face in essentially the same direction.

10. A mixing valve as set forth in claim 6, wherein:
(a) said control member is provided with inlet passages intersecting the surface of said control member at said regions;
(b) and said valve units include seat elements sealingly engageable with the surface of said control member.

11. A mixing valve, comprising:
(a) a valve structure having a hot nad a cold water inlet, a mixed water outlet, and parallel guide bores in alignment with said inlets;
(b) valve elements for said inlets including cam follower members slidable in said bores;
(c) a manually operable control means for said valve elements including essentially triangular areas defining cam surfaces engageable with said cam followers;
(d) means incorporating said control means and said valve structure for limiting said control means to two degrees of movement;
(e) and confronting essentially coextensive and annular stop shoulders incorporating said control means and said valve structure, surrounding said cam areas and disposed for mutual rolling engagement;
(f) one of said shoulders forming a three lobe cam for limiting said control means to an essentially triangular movement corresponding to the boundaries of said cam areas.

References Cited
UNITED STATES PATENTS
2,792,847   5/1957   Spencer _____ 137—636.2
FOREIGN PATENTS
575,346   5/1959   Canada.

ALAN COHAN, *Primary Examiner.*